US012219200B2

(12) United States Patent
Prabhu et al.

(10) Patent No.: US 12,219,200 B2
(45) Date of Patent: *Feb. 4, 2025

(54) SYSTEM AND METHOD FOR A SELF ADAPTIVE, MULTI-USER PROGRAM GUIDE

(71) Applicant: Universal Electronics Inc., Scottsdale, AZ (US)

(72) Inventors: Bhuvanesh Prabhu, Bangalore (IN); Anurag Thakur, Bangalore (IN)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,260

(22) Filed: Oct. 25, 2023

(65) Prior Publication Data

US 2024/0073471 A1 Feb. 29, 2024

Related U.S. Application Data

(63) Continuation of application No. 16/816,433, filed on Mar. 12, 2020, now Pat. No. 11,849,169.

(51) Int. Cl.
| | |
|---|---|
| *H04N 5/76* | (2006.01) |
| *H04N 9/80* | (2006.01) |
| *H04N 21/4147* | (2011.01) |
| *H04N 21/422* | (2011.01) |
| *H04N 21/462* | (2011.01) |
| *H04N 21/466* | (2011.01) |
| *H04N 21/482* | (2011.01) |
| *G11B 27/00* | (2006.01) |

(52) U.S. Cl.
CPC ... *H04N 21/4147* (2013.01); *H04N 21/42203* (2013.01); *H04N 21/4622* (2013.01); *H04N 21/4667* (2013.01); *H04N 21/4825* (2013.01)

(58) Field of Classification Search
CPC . H04N 5/76; H04N 9/80; H04N 27/00; G11B 27/00
USPC .......................... 386/291, 297, 299, 239, 278
See application file for complete search history.

(56) References Cited

U.S. PATENT DOCUMENTS

| | | | |
|---|---|---|---|
| 7,796,980 B1 * | 9/2010 | McKinney | H04H 60/72 455/418 |
| 10,499,111 B2 | 12/2019 | Arling et al. | |
| 2007/0016847 A1 | 1/2007 | Reichardt | |
| 2011/0050975 A1 * | 3/2011 | Chung | G06F 1/1624 345/1.3 |
| 2014/0047467 A1 * | 2/2014 | Arling | H04N 21/4753 386/297 |

(Continued)

OTHER PUBLICATIONS

Extended European Search Report from application No. 21768099, dated Jun. 29, 2023, 14 pp.

(Continued)

*Primary Examiner* — Daquan Zhao
(74) *Attorney, Agent, or Firm* — Greenberg Traurig, LLP

(57) ABSTRACT

A programming access device such as, for example, a cable or satellite set top box (STB), a digital video recorder (DVR), a personal computer, and/or a digital media receiver automatically optimizes an order of content choices presented in a content listing, such as a program guide display, favorite channel display, and/or a recording listing display based on the past viewing and/or recording history of an identified user.

13 Claims, 7 Drawing Sheets

(56) References Cited

U.S. PATENT DOCUMENTS

2014/0122087 A1\* 5/2014 Macho .................... G10L 15/22
    704/275
2014/0188485 A1\* 7/2014 Kim .................... H04L 12/2829
    704/275
2016/0337702 A1\* 11/2016 Klappert ............ H04N 21/4316
2018/0192117 A1   7/2018 Liston

OTHER PUBLICATIONS

ISA/US, Int. Search Report and Written Opinion issued on PCT application No. PCT/US21/21835, dated Apr. 1, 2021, 8 pp.

\* cited by examiner

SYSTEM AND METHOD FOR A SELF ADAPTIVE, MULTI-USER PROGRAM GUIDE

RELATED APPLICATION INFORMATION

This application is a continuation of and claims the benefit of U.S. application Ser. No. 16/816,433, filed on Mar. 12, 2020, which application is incorporated herein by reference in its entirety.

BACKGROUND

This invention relates generally to improved methods for display of media content listings. In this regard, the growing volume of media content available to consumers via cable/satellite, Internet, DVR, etc., increasingly necessitates some means of prioritizing a program guide information listing to match the requirements of a user. Contemporaneously, multi-room cable/satellite/streaming installations, advances in DVR capacity, etc., are resulting in both an increased number of users per household and increasing instances of concurrent media consumption at multiple locations within a household. Additionally, the deployment of "whole house" systems in which a high capacity central DVR is shared amongst multiple TVs may result in an increased number of different users initiating recording requests to a single DVR system. Accordingly, it is desirable to dynamically personalize content access and/or favorite channel listings to match the requirements of a requesting user. While existing methods, such as those described in U.S. Pat. No. 10,499,111, the disclosure of which is incorporated herein by reference in its entirety, are available to perform such personalization, some on a per-user basis for multi-user systems, many of these methods are complicated in use and/or require considerable user involvement in configuring and setting up a system for use.

SUMMARY

A media access device such as, for example, a cable or satellite set top box (STB), a DVR, a personal computer, digital media receiver, a voice assistant, and/or the like, may optimize the order of content choices presented in a content listing, such as a program guide or favorite channel display, based on the past viewing history of a current user. Similarly, the media access device may arrange the display of a content listing related to an integrated or associated DVR device so as to give priority to those entries within the content listing corresponding to recording requests which were originated by a current user.

For the purposes of this disclosure, a current user may be determined using any convenient method, for example via user-specific remote controls which may be either stand-alone devices or remote control apps installed on smart phones, tablets, game controllers or similar devices (collectively hereafter "smart devices"); by provision of one or more remote controls adapted to utilize biometric information to identify the current user, for example fingerprint detection, voice recognition, or hand tremor pattern recognition; by provision of a camera together with facial recognition software accessible to the media access device; via explicit user identification by way of a button input, log-in, menu choice, or the like; or any other appropriate method. The smart device may particularly take the form of a voice-activated controlling device such as described in US 2019/0020493, the disclosure of which is incorporated herein by reference in its entirety.

When provisioned with user identification means as above, a media access device and/or a smart device adapted to control the media access device may log the actual amount of time spent watching each channel or other content source by each individual user. In some embodiments, the device may also capture and log time/date information in order to further refine a program guide or a favorite channel display based on time of day, day of week, or season, e.g., conventional time seasons, sports seasons, or the like. As will be appreciated, in some embodiments program guide displays may not be limited to listing only broadcast content but may include listings from other content sources, e.g. broadcast, cable/satellite on demand, DVR recordings, Internet streams, etc., individually or collectively.

The following also describes systems and methods that may be used to create user specific favorite channel list dynamically whereupon the user created favorite channel list may be stored in a device that includes the ability to process voice input and which is adaptable to issue commands to one or more appliance, e.g., a voice assistant. Here, it is not necessary to store the favorite channel list in set top box and, as a result, there will be no limitations on favorite channel storage in a set top box or number of users of favorite channel functionality. That means every user in house can have their own list of favorite channels which list of favorite channels can vary by time of day and day of week. Furthermore, in such a system user 1 in a home may have a different set of favorite channels during morning, different at night or different at weekends. The listing of favorite channels will be created based on what a user watches at what time of the day and what day of week. Based on user voice recognition, these favorite channels can get set for each user in a home. Using voice reorganization will also help to enable parental control and will be a relief for old age peoples. The dynamic favorite channel list may also be created with respect to user's locations, user's activity, etc.

A better understanding of the objects, advantages, features, properties and relationships of the subject systems and methods will be obtained from the following detailed description and accompanying drawings which set forth illustrative embodiments and which are indicative of the various ways in which the principles of the claimed invention may be employed.

BRIEF DESCRIPTION OF THE DRAWINGS

For a better understanding of the various aspects of the subject systems and methods, reference may be had to preferred embodiments shown in the attached drawings in which.

DETAILED DESCRIPTION

Figure 1:
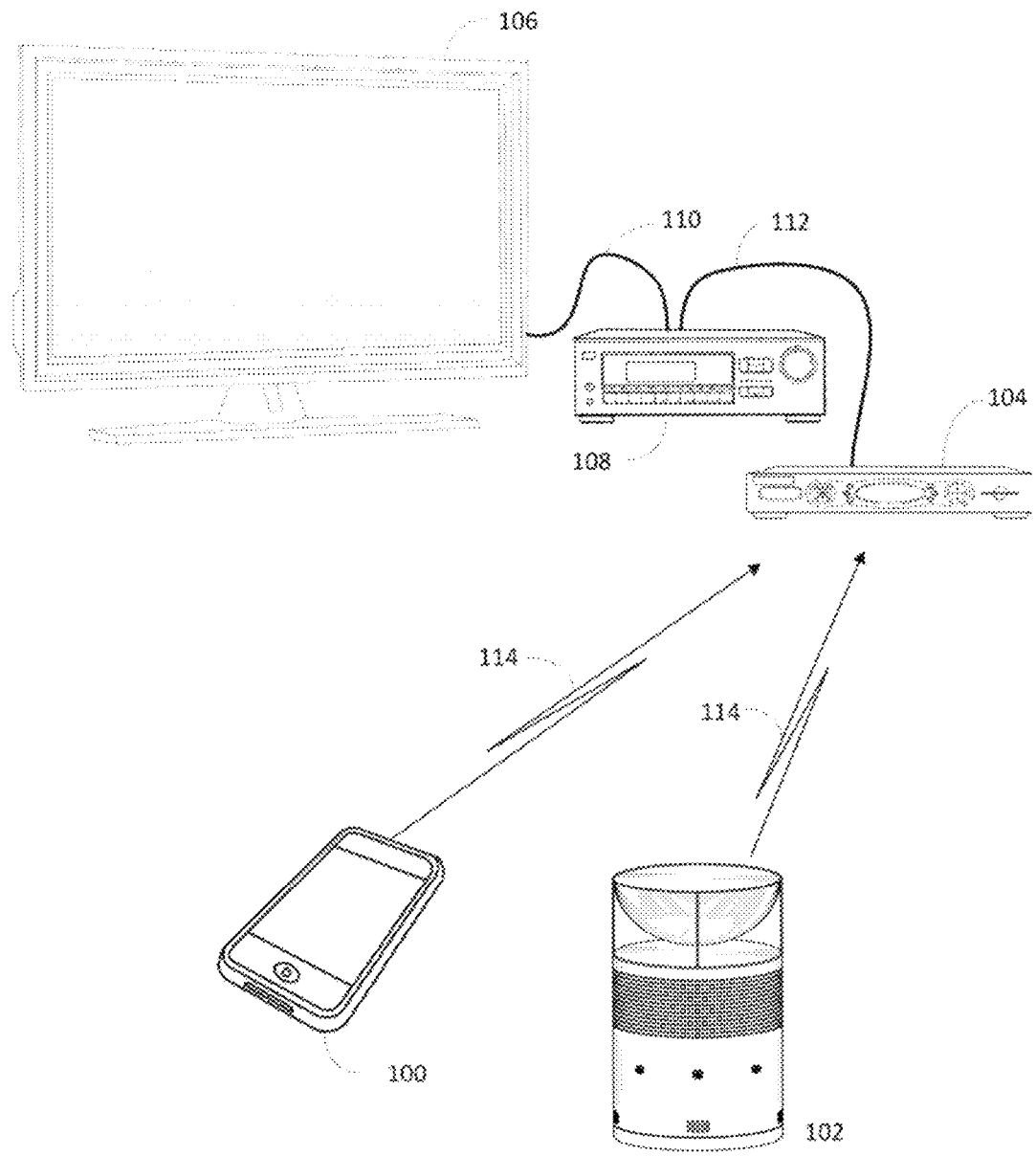
FIG. 1 illustrates an example system in which the methods described hereinafter may be utilized.

With reference to FIG. 1, the methods described herein may be used in conjunction with an exemplary system comprised of one or more of a cable/satellite/digital media streaming set top box, (individually and collectively a "STB" 104), an appliance having digital video recorder ("DVR") capabilities, and a display device, such as a television ("TV"). One or more individual smart devices 100, 102 such as an "iPhone", "iPad", "Android", "Google Assistant", "Amazon Echo", etc. may be provisioned with a remote-control app or "skill" for use in causing commands to be issued to appliances such as STB 104, TV 106, AV receiver 108, etc., particularly in response to voice input being provided by one or more users. Examples of smart device remote-control apps/skills may be found in co-pending U.S. patent application Ser. Nos. 12/406,601 and 13/329,940 and U.S. Publication 2019/0020493. In some circumstances, it will be appreciated that an appliance may itself be adapted to receive and act upon voice input according to the description which follows, e.g., the described smart device would be a component part of the appliance.

Communication 114 from a smart device 100, 102 to another device, such as STB 104, may take the form of any convenient infrared (IR), radio frequency (RF), hardwired, point-to-point, or networked protocol, as necessary to cause the respective target appliances to perform the desired operational functions. By way of example, an IR signal may be transmitted to an appliance, such as STB 104, directly as described in co-pending U.S. patent application Ser. No. 13/043,915 or via an intermediate relay device (not illustrated) such as described in co-pending U.S. patent application Ser. No. 13/071,661. Similarly, an RF communication, such as any of RF4CE, Bluetooth, WiFi, etc., may be utilized as appropriate for a given intended target appliance.

In keeping with the teachings set forth herein, a media access device, such as STB 104, television 106, etc., may be capable of adapting content listings, such as program guide displays, DVR recording listings, favorite channels listings, etc., in accordance with which one (or more) of multiple users is currently interacting with the media access device, particularly via use of a voice communication that is provided to a smart device and/or an appliance having the described smart device capabilities. When a device is not itself capable of displaying a listing or guide, the device, such as STB 104, may be connected to TV 106 using an HDMI interface. The HDMI connection may be via an intermediate switching device such as an AV receiver 108 (HDMI cables 110, 112) or may be direct.

It will be appreciated that a voice recognition, user identification technique may be used alone or with other techniques, such as with a camera based, user identification technique, to determine which one or more of multiple users are interacting with the system as desired.

Figure 2:
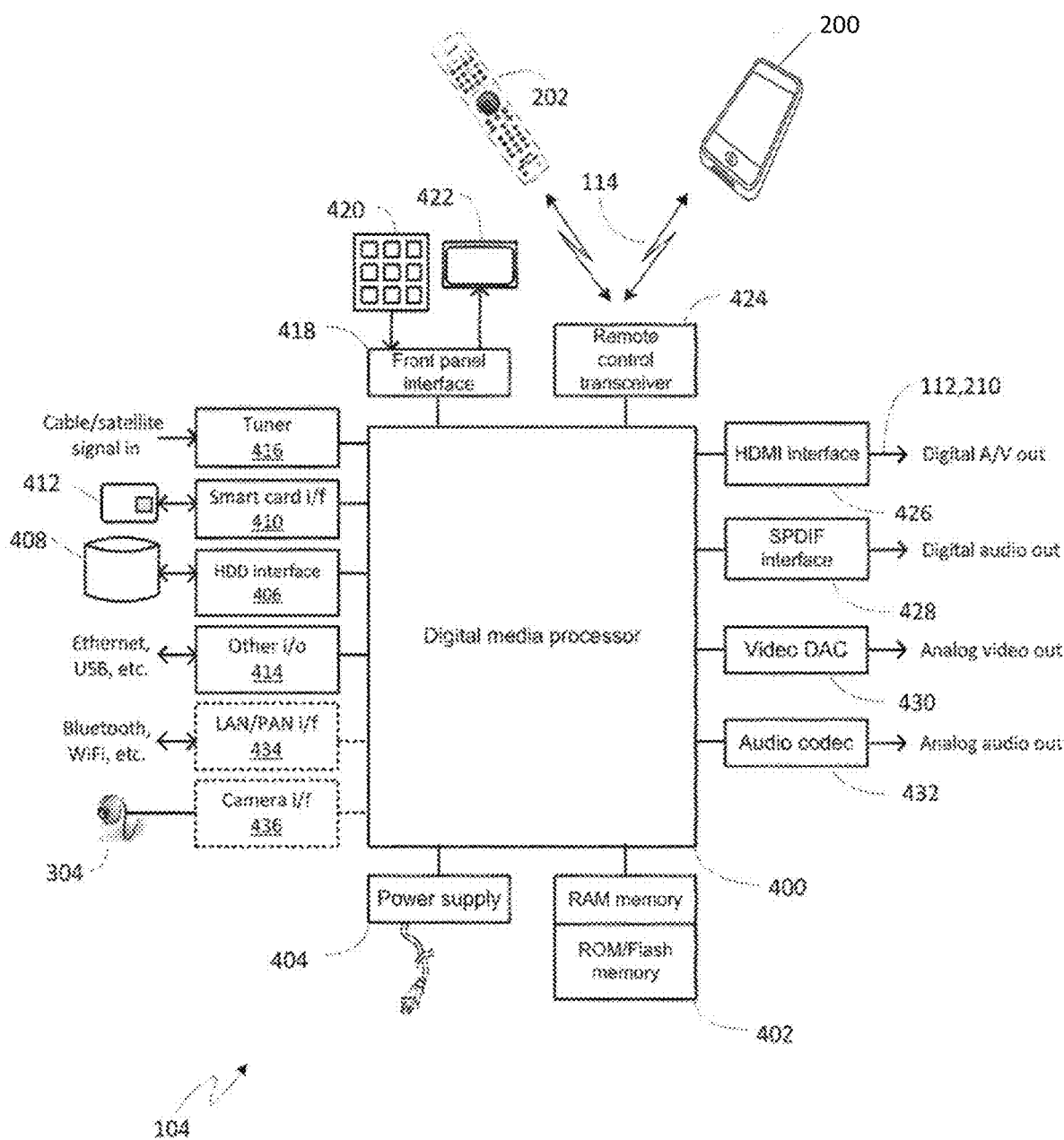
FIG. 2 illustrates a block diagram of components of an example media access device.

Turning now to FIG. 2, a media access device, such as STB 104, may include, as needed for a particular application, a processor 400 coupled to a memory 402 which may comprise RAM, ROM, and/or Flash memory; a power supply 404; a hard disk (HDD) interface 406 and associated disk drive 408, for example to support DVR functionality; a smart card and/or PCMIA interface 410 where required to accommodate service enablement/decryption cards 412; other input/output interfaces 414 such as USB, Ethernet, etc.; a front panel interface 418 with associated front panel keypad 420 and display means 422; a remote control receiver or transceiver 424 for reception of signals from a controlling device 200; a digital audio/video output interface 426 such as an HDMI port; a digital audio output 432 such as an SPDIF connection; analog video and audio outputs 430, 432; and one or more tuners 416 for receiving and demodulating a cable or satellite signal. As will be appreciated, in general tuner 416 may be capable of receiving both one or more digital media streams comprising program content and a so called out-of-band data stream comprising, for example, program and/or program guide information, software updates, etc.

The controlling device 200 may be a smart device having an app/skill installed thereon, may be a conventional remote control provisioned with a microphone for receiving voice input and for providing data indicative of the voice input to the media access device (either directly or via a voice processing service), or may be a conventional remote control with the media access device having a microphone and being used to receive and process voice input.

The media access device, such as STB 104, may also include a wireless LAN and/or PAN interface 434 supporting communication over Bluetooth, WiFi and/or WiFi Direct links. As will be appreciated, when so equipped, in certain embodiments STB operational commands may be received via wireless interface 434, for example from a smart device such as 100, in place of or in conjunction with command transmissions received via remote control transceiver 424. Furthermore, in certain embodiments, Ethernet and/or WiFi interfaces 414, 434 (or any other appropriate method) may be used to network together a group of media access devices, for example to allow multiple TVs in a household to access a centralized DVR capability. Still further, in some embodiments an input peripheral, such as a camera and/or a microphone, and/or a peripheral interface 436 may be provided for use in receiving commands and for use in user recognition purposes as described herein, etc. It will be appreciated that in alternative embodiments a peripheral may be interfaced via wireless network interface 434.

As is known in the art, programming instructions may be stored in a non-transitory readable memory 402 which, when executed by processor 400, may enable the media access device, e.g., STB 104, to do all or some of receive and decode digital media streams and data streams, including program and/or program guide information, from tuner 416, from the Internet, etc.; to facilitate the storage of received media content and data on HDD 408 or in memory 402; to output received (from tuner 416, the Internet, etc.) or retrieved (from HDD 408) media content via one or more of the output ports 426, 428; to monitor other I/O ports 414 for activity; to receive, decode, and act upon user commands received from a controlling device 200 or input via front panel 420; to display content listings, such as one or more of program guide information, listings of stored content, listings of favorite channels, etc.; to display setup and configuration menus at user request and act upon any resulting user input; etc. As will described hereafter, the media access device (or smart device usable with the media access device 104) may also include programming for monitoring the viewing habits and, optionally, recording requests of multiple users and utilizing the information gathered to prioritize, filter, and/or otherwise arrange content information (which may include DVR content) for display.

Figure 3:
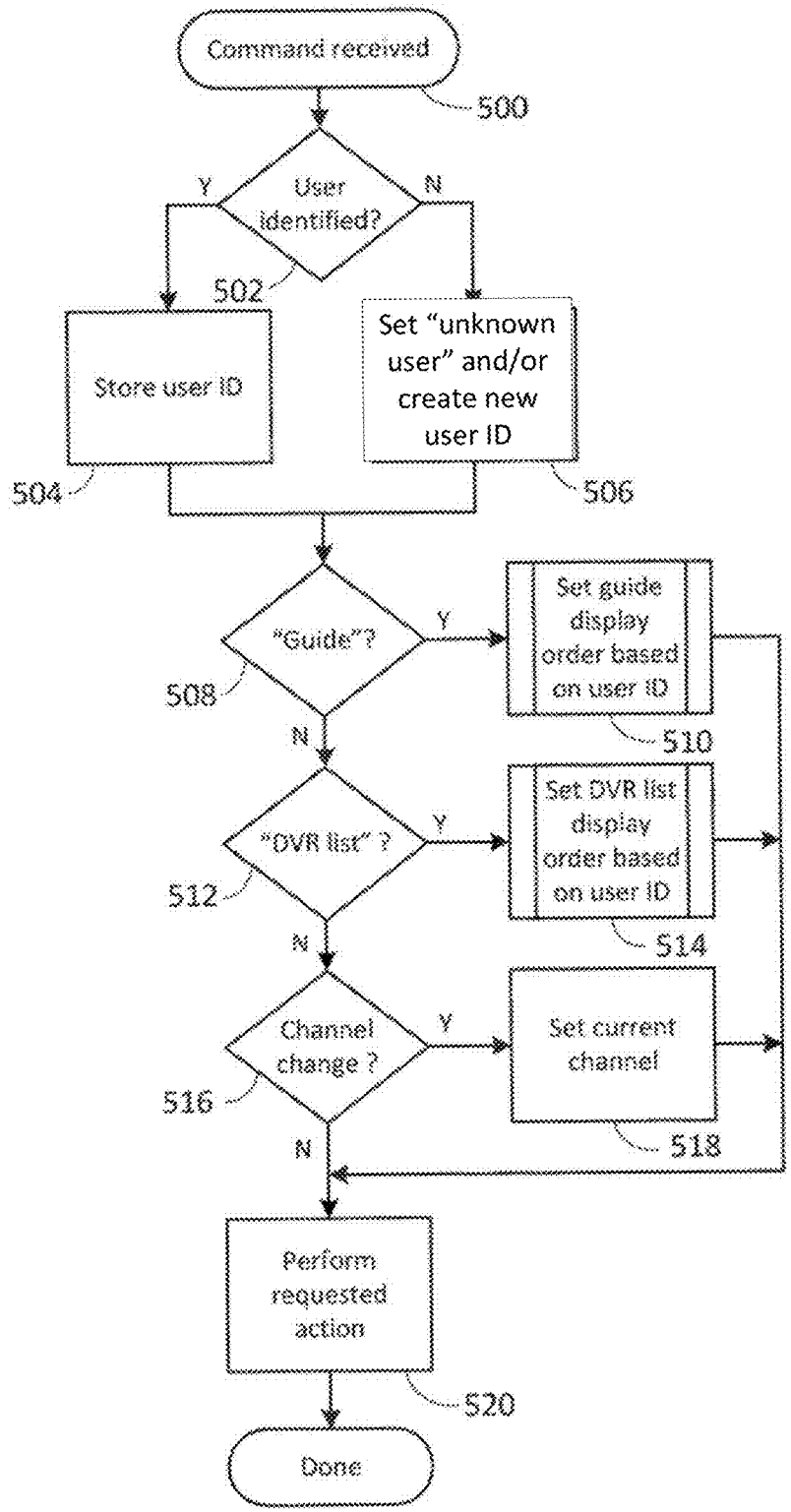
FIG. 3 illustrates by way of flowchart an example series of steps which may be performed by the programming of a device (or devices) when processing a user-initiated command.

FIG. 3 illustrates in flowchart form a series of actions which may be performed by the programming of a media access device, such as STB 104, upon executing a command. Note that in this context "executing a command" constitutes an action to be performed by the media access device. For example, an action may comprise a response to one or more commands received as a result of button presses on an associated remote control, a response to a voice input received from a smart device, a response to an internally generated action, a command received via a local area or wide area network, etc. The response may include causing a display of a content listing.

Upon receipt of a command at step 500 (whether received from an external source or generated internally), at step 502 the device programming may first determine if the current user has been identified or is identifiable. For purposes of this disclose, user identification will be determined at least using a received voice input and the discerning of a speaking user may be performed using any convenient technique or combination of techniques as appropriate for a particular embodiment. An example technique for using voice recognition is described in U.S. Pat. No. 6,256,109.

If the current user is identifiable, at step 504 an ID for the user is stored for use in subsequent steps. If not, the system may request that the speaker speak again for purposes of again attempting to identify the user and/or may assign a new ID for the new user 506 for tracking purposes as described below. As will be appreciated a voice print for the voice input provided by the user as captured in step 504 may be mapped to the new ID for subsequent use in subsequent command processing. In other instances, the actions of an unknown user may simply be ignored for tracking purposes.

Figure 4:
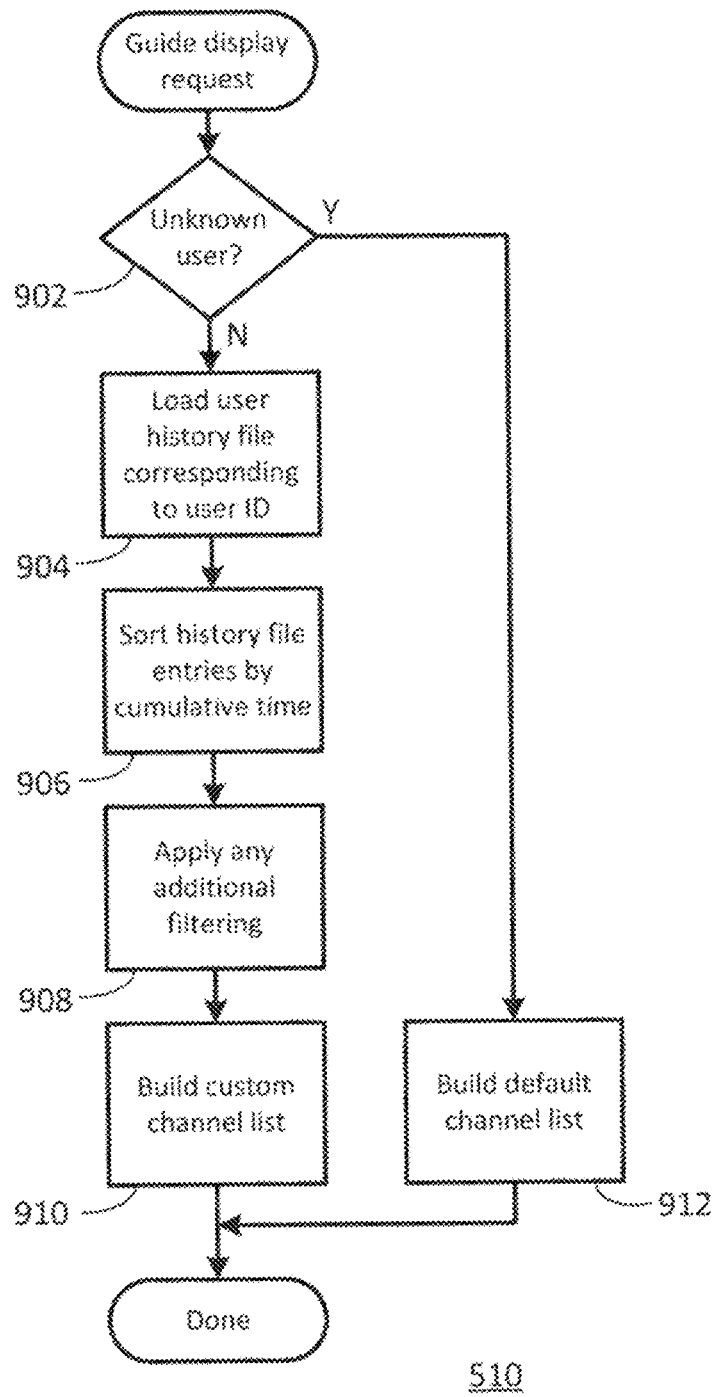
FIG. 4 illustrates by way of flowchart an example series of steps which may be performed by the programming of a device (or devices) when processing user initiated content guide display requests.
Figure 5:
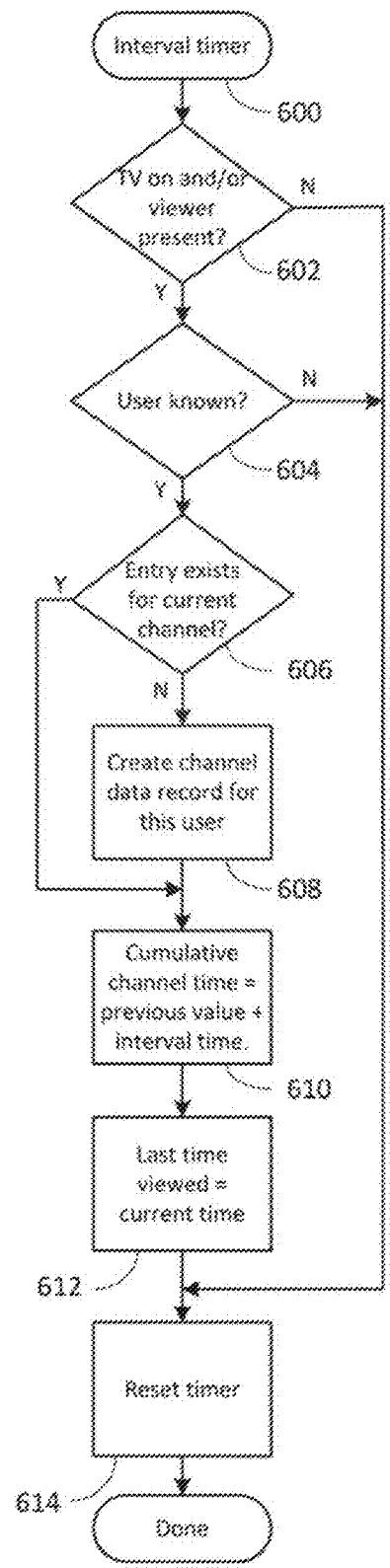
FIG. 5 illustrates by way of flowchart an example series of steps which may be performed by the programming of a device in order to capture and log user viewing histories.
Figures 6, 7:
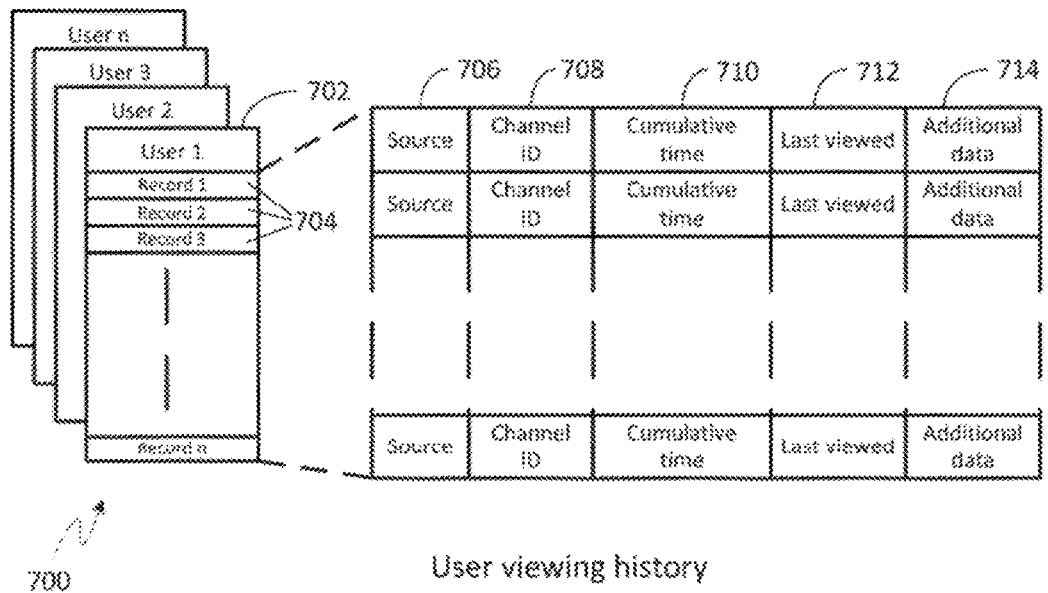
FIG. 6 illustrates an example data structure which may be used for recording user viewing history.
FIG. 7 illustrates an example data structure which may be used to manage DVR recording requests.

If at step 508 it is determined that the received command is a request to initiate a content guide display, at step 510 the information that is presented in the content listing, e.g., broadcast channels and/or other available content items (e.g., streaming or VOD programs), may prioritized as described hereafter in conjunction with FIG. 4 considering the current user's viewing history, gathered as described hereafter in conjunction with FIGS. 5 through 7. Similarly, if at step 512 it is determined that the request is to initiate display of previously recorded content, at step 514 entries which correspond to recording requests which were initiated by the current user may be given priority in the resulting listings display.

As will be appreciated, in some embodiments recorded content may also be incorporated into the display of program guide listings, either automatically or by user request. In some embodiments, the recorded content may be placed at the top of a content listing over content guide information when the system is operating in a DVR control mode, e.g., the remote control is in a DVR control mode, and may be placed at the bottom of a content listing following program guide information when the system is operating in a TV, Satellite, Cable, Internet Media, or the like mode. Additionally, a recorded item portion of content listing may be filtered, e.g., comprise only recorded content attributable to the current user and/or comprise only recorded content suitable for the current user (e.g., considering content ratings or the like versus the actual or perceived age of the current user); and/or may be prioritized, e.g., encompass all recorded material, but with recordings attributable to or frequently viewed by the current user appearing first in the displayed listing or being otherwise made more visually prominent. Depending on the particular embodiment, the style of recorded item listing presentation, filtered and/or prioritized, may be predetermined by design or may user configurable, either globally for all users or on a per-user basis.

If at step 516 it is determined that the received command is a request to change to a new channel, to commence a different media stream, etc., the identity of the new channel, media stream, etc. (and, optionally, the source thereof) may be stored at step 518 for reference during the viewing history accumulation process as will be described hereafter in conjunction with FIG. 5. Thereafter, at step 520 the requested action may be performed by the device programming and command execution is complete.

FIG. 5 illustrates in flowchart form a series of actions which may be performed by the device programming to accumulate user viewing history data, stored for example as illustrated in FIG. 6. Referring first to FIG. 6, the device programming may cause a set of viewing history data files 700 corresponding to each separately identifiable user of the system to be maintained in storage, e.g., in local memory and/or remote memory (such as memory associated with a cloud server). In certain embodiments, an additional data file for an "unknown," or default, user may also be maintained. As illustrated, each individual user history file 702 may comprise a series of records, each record 704 comprising a series of fields, for example:

Content source identity 706. By way of example possible content sources may include cable or satellite service providers providing channels accessible via tuner 416, Internet content sources, e.g., media streaming services, accessible via Ethernet 414 or WiFi 434 interfaces, previously recorded DVR material accessible from HDD 406, etc.

Channel ID 708. By way of example, possible channel IDs may comprise a cable system channel number, a URL, a DVR directory entry, a media streaming title, etc. as appropriate for the content source 706 associated with that record.

Cumulative viewing time 710 for this user, which may be accumulated as described hereafter.

Last viewed time 712, which may comprise the absolute time and date of the last viewing of this particular content source and channel by this particular user, maintained in some embodiments to allow for removal of and/or modification of stale entries by the device programming.

In some embodiments, additional information 714 regarding viewing habits may be captured and used to further refine selection or prioritization of items for content listing display. By way of example and without limitation, field 714 may contain several subfields corresponding to time of day, day of week, and/or month of year; genre; etc. which may be used to accumulate data for use in further optimizing content guide displays based on daily, weekly, seasonal, or other factors.

In order to track and capture user viewing history, the STB programming of STB 104 may utilize a timer function to periodically inspect and capture the state of the system. This timer period may be any convenient value suitable for providing an appropriate level of granularity to the captured data while not imposing an overly large processing burden on the STB. In one exemplary embodiment, the timer period may be of the order of several minutes. It will also be appreciated that in some embodiments the timer interval may be variable: for example, the timer interval may be reduced (or lengthened) for several cycles immediately following execution of a channel change command in order to better detect and accurately capture (or disregard) channel surfing activity in which a user may only dwell on a particular content stream for a short period of time.

Returning now to FIG. 5, upon timer expiry 600, at step 602 the STB programming may first determine content is being rendered. To this end, the STB programming may determine if TV 106 (or another device by which media content can be consumed) is in fact powered on and, when determinable, rendering STB-supplied content. Such a determination may be made using any convenient method, for example TV status as reported over HDMI interface 426; TV power monitoring by the STB itself or by an external device such as described for example in U.S. Pat. No. 6,870,463; inspection of simulated state of TV 106 maintained as described for example in U.S. Pat. Nos. 7,126,468 or 6,784,805; etc. Additionally, in embodiments where viewer presence detection is available, for example via a camera interface 436 on STB 104; by detection of the presence of a user's smart device on a local network; via passive infrared detection; etc., the user presence status may also be ascertained at this step. If the TV is not on or no viewer is present, no further action is required, the timer is reset at step 614, and processing is concluded.

If TV 106 is powered on and viewer(s) are present (if presence is utilized), at step 604 the STB programming may next determine if the current user is known to the system (i.e., a valid user ID was stored at step 504 of FIG. 3 when executing the last user command received by STB 104). If not, processing concludes as before. If so, at step 606 the STB programming may next determine if a record 704 corresponding to the current channel (i.e., the source and channel ID value last stored at step 518 of FIG. 3 when executing a channel or media stream change command) already exists in the individual viewing history file 702 of the current user. If not, at step 608 a new record may be created. Thereafter, at step 610 the cumulative viewing time 710 for that record may be incremented, for example by adding the elapsed timer value to any current value in field 710 and storing that new value, and the last viewed field 712 may be updated by storing the current date/time into field 712. In those embodiments where they exist, additional data field(s) 714 may be updated as well. Thereafter, at step 614 the timer is reset, and processing is concluded.

As will be appreciated, to ensure optimal performance, the STB programming of STB 104 may periodically engage in data maintenance or "housekeeping" activity with respect to the user viewing history files. Scheduling of such activity may be on a calendar basis, e.g., weekly or monthly; may be on an elapsed time basis, e.g., after a predetermined number of active viewing hours have been logged; may be by explicit user request; may be based on a combination thereof; or may be on any other basis appropriate for an embodiment. Maintenance activity may comprise for example removal of stale records 704, e.g., those with a "last viewed" date older than a certain date, which date may be a predetermined value or may be dynamically determined based on system resources such as available memory, those that have a date, are related to content genre, etc. that are no longer in season, and the like. Alternatively, in some embodiments stale records may not be removed immediately, but may rather be subjected to a gradual downgrading process, for example by a step-wise reduction in accumulated time value 710, which, as will become apparent, may cause the corresponding channel ID to appear increasingly lower in the program guide listing display.

It will be understood that, while the above processing is being described as being performed by the STB, some or all of the processing may be performed by a smart device that receives voice commands (and other input) from a user, by a cloud server to which voice commands (and other input) is provided for processing, etc.

FIG. 7 illustrates an example, recorded content directory 800 which may be used in conjunction with the methods described herein. Within this content directory, each entry 802 corresponds to a single recorded or to-be-recorded item and comprises a series of fields as follows:

Item ID field 804 may comprise a unique item identifier, which may be used for example to populate a channel ID field 708 in a user viewing history record 704 when source device field 706 is "DVR".

Requesting user field 806 may be the user ID of the user requesting the recording, for example the user ID captured at step 504 of FIG. 3 during input of the recording request command.

Status field 808 may reflect the current status of this request within the DVR system, for example "Successfully recorded", "Yet to be recorded", "Recording in progress", "Recording error", etc. In some embodiments, the status field 808 may also reflect if a user has watched a recorded program.

Title field 810 may contain the title of the content, which, for example, may be derived from the program guide information stored in STB memory at the time the recording request was initiated.

Source/channel field 812 may contain the content source and channel ID from which the desired content was or is to be recorded.

Date field 814, start time field 816, and end time field 818 may define the recording instance, which as before may be derived from the program guide information stored in STB memory at the time the recording request was initiated. It will be appreciated that the contents of date field 814 may also include an indication of that the request is for "series recording," i.e., all episodes of a recurring program are to be recorded. By way of example, one method for implementing such a feature may comprise automatically inserting a further entry 802 into the DVR content directory 800 each time an existing series recording request is completed (i.e., when updating status field 808 to "Successfully recorded").

Other information field 820 may contain, as appropriate for an embodiment, additional information regarding the content (e.g., release date, cast members, etc.) and/or DVR housekeeping information (e.g., HDD directory pointers, retention period settings, etc.). Additionally, in certain embodiments other information may include subfield(s) for storing the user IDs of secondary users, e.g., users who, although not the originators of the recording request, may have viewed or otherwise expressed interest in this item of content. As will be appreciated, in the case of series recording requests, such additional user information may also be propagated forward as future recording request entries are generated.

For filtering purposes, it is also contemplated that the system may capture genre and/or ratings information for a recorded program. In this manner, for example, the genre and/or ratings information can be utilized to filter information within a displayed content listing based upon a viewing permission level for that user thus providing a form of parental control.

With reference to FIG. 4, processing of a user request for display of a program guide listing by the STB programming of STB 104, for example as may occur at step 510 of FIG. 3, may comprise the following steps:

At step 902, STB programming may first determine—using the voice command provided by the user—if the current user is known or unknown. If unknown, at step 912 the default action established for that condition may be taken. This may comprise, for example, simply arranging the information in a displayed content listing, e.g., a program guide, in ascending or descending channel number sequence; prioritizing the information if a displayed content listing as described hereafter using a default viewing history that has been maintained for "unknown user;" using a content provider supplied preferred order; or any other arrangement as appropriate for a particular embodiment. In some instances, if the voice input from the unknown speaker appears to indicate that the speaker is a minor, the content can be filtered in accordance with any parental control established for the system If the current user is known, at step 904 the STB programming may retrieve the user history file 702 corresponding to the current user. At step 906, the individual entries 704 of the retrieved history file may be arranged in descending order of accumulated viewing time 710. At step 908 any additional filtering factors may be applied to further adjust the order of the sorted entries, for example without limitation, a factor derived from the "last viewed" information field 712 may be applied to promote more recently viewed items over older entries; time/date information from additional data 714 (where available) may be compared to the current time/date to adjust for daily, weekly or seasonal factors; etc Thereafter, at step 910 the source and channel ID fields 706, 708 from the newly-ordered viewing history data may be used to prioritize an order in which the information within a content listing is displayed, i.e., to thereby provide a user-specific order to the listing of the content of the program guide that is caused to be displayed, for example, during the execution of step 520 of FIG. 3.

Figure 8:
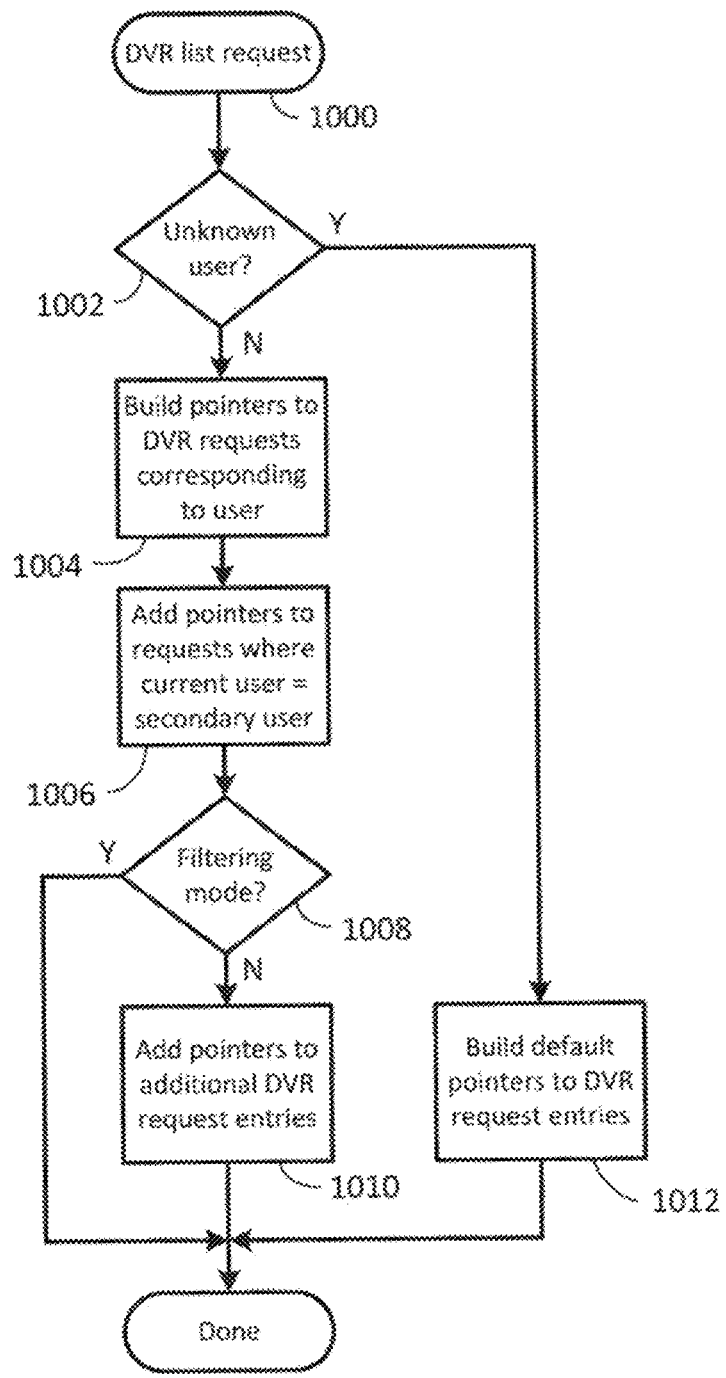
FIG. 8 illustrates by way of flowchart an example series of steps which may be performed by the programming of a device when processing user initiated requests to list recorded content.

With reference to FIG. 8, processing of a user request for display of a listing of available, recorded content by the STB programming of STB 104, for example as may occur at step 514 of FIG. 3, may comprise the following steps:

At step 1002, STB programming may first determine if the current user is known or unknown. If unknown, at step 1012 the default action for that condition may be taken, for example preparing to list all DVR content in chronological or alphabetical order; preparing to list only content corresponding to DVR content directory entries 802 in which the requesting user field 806 is set to "unknown;" or any other arrangement as appropriate for a particular embodiment. As before, voice processing can be utilized to determine if a speaker is a minor whereupon further filtering of content may be required depending upon set parental control parameters.

If the current user is known, at step 1004 the STB programming may initially build a set of pointers to a subset of DVR content directory entries corresponding to only those items for which the requesting user field 806 matches the current user and in which status field 808 contains the status "Successfully recorded" or "Recording in progress." Thereafter, at step 1006 the STB programming may add to the set further pointers to DVR content directory entries corresponding to those items for which the current user ID appears as a secondary user in the other information field 820 and status field 808 contains the status "Successfully recorded" or "Recording in progress." Next, at step 1008, the STB programming may determine if the DVR content display feature is operating in filtering or prioritizing mode. As described previously, in filtering mode only the DVR content attributable to the current user (and/or accessible by the current user) may be displayed. Accordingly, if the STB programming is operating in filtering mode, generation of DVR content directory pointers for use by a display routine, for example during the execution of step 520 of FIG. 3, is complete and processing ends.

If operating in prioritizing mode, at step 1010 the STB programming may next append additional DVR content directory pointers to the set created during steps 1004 and 1006 above, e.g., to display such additional DVR content at the end of the displayed DVR content directory, in a supplemental directory, etc. Such additional pointers may comprise the balance of the DVR content directory entries in chronological or alphabetical order, or any other ordering as appropriate for a particular embodiment. Thereafter, generation of an ordered list of DVR content pointers is complete and ready for use by a display routine, for example during the execution of step 520 of FIG. 5.

As also described above, a combination of prioritizing and filter may be employed whereupon a known user would be provided with a content listing in which the information in the content listing is prioritized considering recording requests made by that user, that user's content watching history, etc. while removing from the displaying listing of content those recorded programs that the user is not authorized to access, e.g., the rating is not within a ratings limit set for that user.

As noted above, voice commands provided to a voice assistant can be used to generate data sets or logs and these data sets can be analyzed to identify a user's behavior with respect to content being accessed, the timing (Day, weekday etc.) of such access and/or the location (geo, IP location, etc.) of such access for the purpose of creating a dynamic favorite list for a user based on voice recognition. It will therefore be appreciated that favorite channel lists can vary by user in home and each user in a home can have their own favorite channel list.

More particularly, for use in creating a dynamic favorite list, the system may store user activity with respect to a selection of content in a database. The stored information can include an identifier for the content and one or more of a timestamp, activity text, intent, the user command (voice file), responsive action taken by the voice assistant, user location, etc. Preferably, user activity with respect to content selection is monitored for a predetermined period of time that will be sufficient to identify one or more content selection patterns, such as frequency for selecting a content, channel, or content source, weekend patterns, weekday patterns, holiday patterns, seasonal patterns, time of day patterns, etc. As described above, the collection of data and the revision of the one or more identified patterns (and the creation and/or deletion of patterns) may be continued after the initial, seeding period of time.

Once one or more patterns have been identified from the data that has been collected, when a give user commands the system to access a favorites list, the system should respond with a dynamically created favorites list. For example, at the specific time when a recognized user provides a command such as "Watch TV" or "Show my Favorite List," the most accessed channel by that user may get selected for viewing or included in a listing that is caused to be displayed. Thus, if user 1 in a home is watching BBC channel at 8:00 PM on most weekdays, a "Watch TV" or "Favorite Channel" command given by the user 1 at approximately 8:00 PM will be used to cause the system to automatically access the BBC channel while, if user 2 is regularly watching CNN at 8:00 PM in same house, then "Watch TV" or "Favorite Channel" command given by the user 2 at approximately 8:00 PM will cause the system to automatically access the CNN channel.

It will be appreciated that the system can be adapted to allow the user to access channels—via repeated verbal commands—in an order that is determined by the favorites list and/or the system can allow the user to simply view the listing whereby the user can interact with the displayed listing as desired.

As also described above, it a user is an unknown user or the favorite channel listing for the user is empty, the system may take a default action and/or execute the above steps to create one or more favorites lists for the user.

While various concepts have been described in detail, it will be appreciated by those skilled in the art that various modifications and alternatives to those concepts could be developed in light of the overall teachings of the disclosure. For example, while the illustrative embodiment presented above is implemented in an STB device, it will be appreciated that the inventive methods may be equally applied to any system in which available media content is to be listed or displayed to a user, including without limitation TV devices, personal computers, media servers, cloud-based media aggregation services, digital media receivers, etc. Furthermore, it will be appreciated that while the exemplary data structures are presented in tabular form for ease of reference herein, in practice these may be implemented in various forms using any convenient data representation, for example a structured database, XML file, cloud-based service, etc., as appropriate for a particular embodiment.

Additionally, it will be appreciate that the methods of the instant disclosure may be combined with other program guide display techniques—for example, a user may define an explicit list of favorite channels to which the techniques described herein are to be applied to the exclusion of other content, or conversely may define a list of preferred channels which are exempt for the prioritization process and will always be displayed; and/or the prioritization process may be applied to multiple genres of content, e.g., separate viewing histories may be maintained for individual categories such as sports, news, drama, comedy, etc.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents, patent applications, and other publications cited within this document are hereby incorporated by reference in their entirety.

What is claimed is:

1. A method performed by a smart device, comprising:
receiving from a user a spoken request to display a listing of a plurality of content accessible via use of a digital media receiver;
using a first data within the spoken request to identify a one of a plurality of individuals that have been pre-associated with the smart device;
using a second data within the spoken request and the identified one of the plurality of individuals to cause a display of the listing of the plurality of content accessible via use of the digital media receiver on a display device associated with the digital media receiver with the listing of the plurality of programs being displayed with an order that is determined as a function of a viewing history data associated with the identified one of the plurality of individuals;
receiving a subsequent spoken request to access a one of the plurality content within the displayed listing; and
using by the smart device a first data within the subsequent spoken request to cause the one of the plurality of content to be accessed via use of the digital media receiver.

2. The method as recited in claim 1, wherein the display device comprises a television.

3. The method as recited in claim 1, wherein the listing of the plurality of content comprises at least one media content that can be streamed from a media content streaming source.

4. The method as recited in claim 3, wherein the at least one media content comprises a song.

5. The method as recited in claim 3, wherein the at least one media content comprises a video.

6. The method as recited in claim 3, wherein the media content streaming source comprises at least one of an internet source of media content, a cable source of media content, and a satellite source of media content.

7. The method as recited in claim 1, wherein using the first data within the spoken request to identify the one of a plurality of individuals that have been pre-associated with the smart device comprises comparing a voice print created from the spoken request to a voice print created from a prior utterance captured from the one of the plurality of individuals.

8. The method as recited in claim 1, wherein the listing of the plurality of content accessible via use of the digital media receiver is displayed with a sub-order that is determined as a function of a time stamp associated with the spoken request and the viewing history data associated with the one of the plurality of individuals.

9. The method as recited in claim 1, wherein the listing of the plurality of content accessible via use of the digital media receiver is filtered as a function of a time stamp associated with the spoken request and the viewing history data associated with the one of the plurality of individuals.

10. The method as recited in claim 1, wherein the listing of the plurality of content accessible via use of the digital media receiver is displayed with a sub-order that is determined as a function of a genre associated with each of the plurality of content and the viewing history data associated with the one of the plurality of individuals.

11. The method as recited in claim 1, wherein the listing of the plurality of content accessible via use of the digital media receiver is filtered as a function of a genre associated with each of the plurality of content and the viewing history data associated with the one of the plurality of individuals.

12. The method as recited in claim 1, wherein the digital media receiver comprises a set-top box.

13. The method as recited in claim 1, wherein the digital media receiver comprises a television.

* * * * *